United States Patent [19]
Sutton
[11] 3,886,320
[45] May 27, 1975

[54] TELEPHONE EXCHANGE SIGNALING SYSTEM

[75] Inventor: Alan Sutton, Dartford, England
[73] Assignee: GTE International Incorporated, Stamford, Conn.

[22] Filed: Oct. 15, 1973
[21] Appl. No.: 406,724

[30] Foreign Application Priority Data
Nov. 10, 1972 United Kingdom............... 52151/72

[52] U.S. Cl. ............................ 179/18 J; 179/18 FG
[51] Int. Cl. .......................................... H04q 11/00
[58] Field of Search....... 179/99, 37, 15 AL, 15 BY, 179/18 J, 18 FG

[56] References Cited
UNITED STATES PATENTS

| | | | |
|---|---|---|---|
| 3,600,518 | 8/1971 | McNeilly et al. | 179/15 AL |
| 3,604,857 | 9/1971 | Opferman | 179/99 |
| 3,643,030 | 2/1972 | Sparrendahl | 179/15 BA |
| 3,673,340 | 6/1972 | Casella et al. | 179/18 J |
| 3,749,848 | 7/1973 | Knollman et al. | 179/99 |

*Primary Examiner*—Thomas W. Brown
*Attorney, Agent, or Firm*—Robert J. Black

[57] ABSTRACT

A telephone exchange system in which a signal responsive element such as a call fee meter, a line cut-off relay or the like is individually associated with each of the telephone lines served, and in which the data processing logic of the exchange includes interrogation means individual to each of a plurality of functional units. In responsive to coincidence between receipt by said functional unit of a signal to which a responsive element is to respond and an output signal from a comparator included in the functional unit an output signal is generated.

3 Claims, 1 Drawing Figure

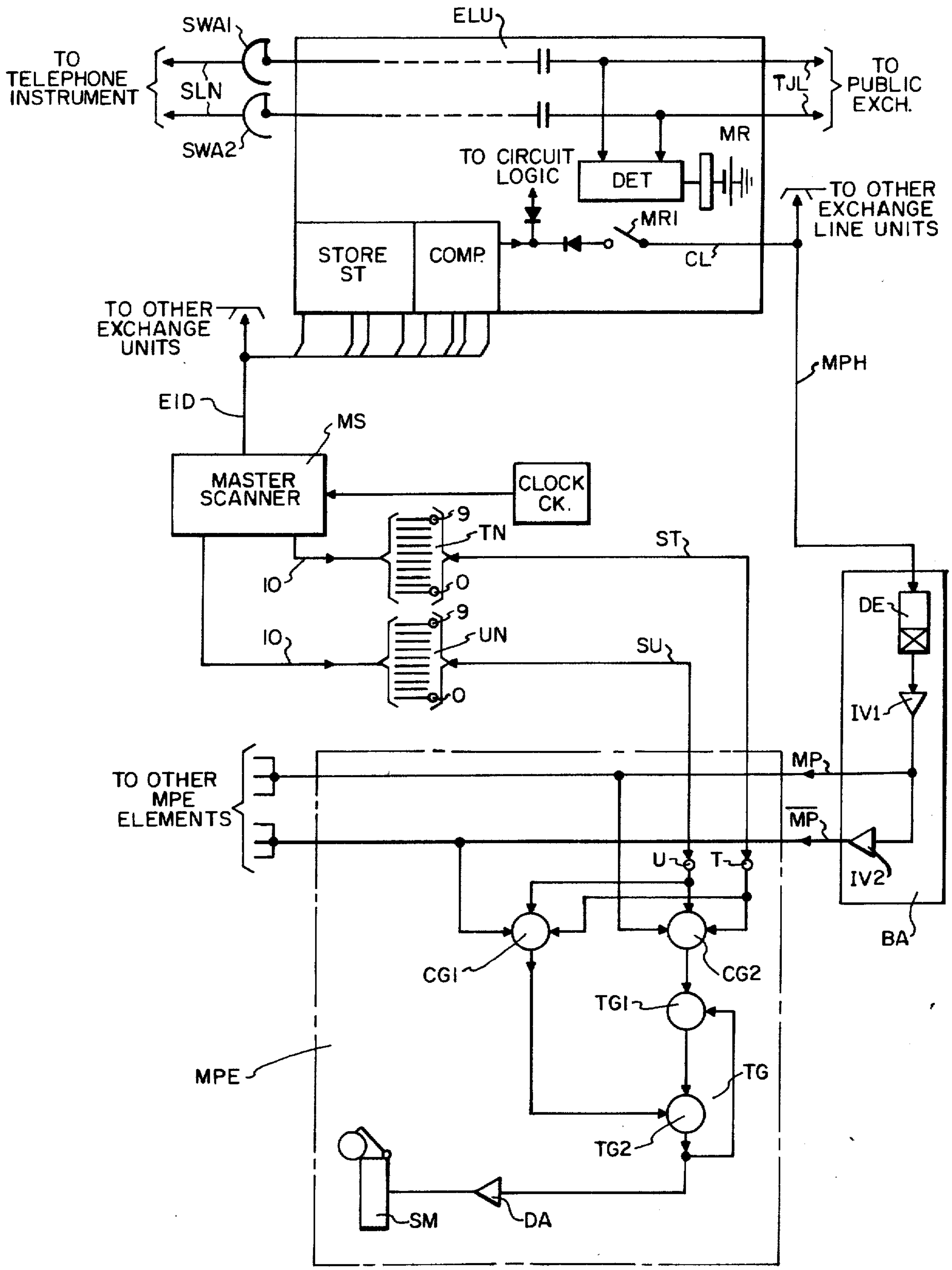
SWAI
ELU
TO TELEPHONE INSTRUMENT
SLN
SWA2
TJL
TO PUBLIC EXCH.
MR
TO CIRCUIT LOGIC
DET
TO OTHER EXCHANGE LINE UNITS
MRI
STORE ST
COMP.
CL
TO OTHER EXCHANGE UNITS
MPH
EID
MS
MASTER SCANNER
CLOCK CK.
9
TN
ST
IO
0
DE
9
UN
IO
SU
0
IV1
TO OTHER MPE ELEMENTS
MP
MP
U
T
IV2
BA
CGI
CG2
TGI
TG
MPE
TG2
SM
DA

TELEPHONE EXCHANGE SIGNALING SYSTEM

This invention relates to automatic telephone exchanges and particularly to signalling arrangements for an automatic telephone exchange.

In the design of two wire exchange switching systems, the transmission of signals between apparatus individually associated with a line wire pair involved in a call and the switch means over which the call is, or is being, established, gives rise to difficulty, expecially if the signals, for example, metering signals, have to be passed while the two wires over which the call is established within the exchange are in conversational use. Known systems employ central data processing apparatus via which such signals may be indirectly transmitted without utilizing the line wire pair. However, the use of such central data processing apparatus is not always commercially viable, especially where the exchange has to be capable of versatile adaption to provide for a variation in the number of subscriber lines to be served by the exchange, and therefore the arrangement described and claimed U.S. Pat. No. 3,838,226 assigned to the same assignee as the present application, has been developed to avoid the need for such a central data processing apparatus.

The above noted co-pending application teaches an automatic telephone exchange system comprising a plurality of separate functional units each including switch means for establishing two wire speech path switching to subscriber lines of the exchange, a store associated with each switch means and providing, independently of the conducting path of the switch, a memory for storing the address of a telephone line with which a connection is established by the switch. Also included are means for generating cyclically and successively the addresses of all the telephone lines served by the exchange, and, associated with each store a comparator for producing an output signal on coincidence between a line address generated and an address contained in the store. The arrangement being such that the combination of all of the stores provide a composite memory storing the addresses of all exchange lines served by the exchange at any given time and capable of being interrogated by data processing logic of the exchange on a time division multiplex basis defined by the address generating means while continuous speech paths are established by the switch means.

The primary object of the present invention is to provide an arrangement applicable to the telephone exchange system of the above reference application to enable transmission of signals to apparatus individually associated with a line wire pair involved in a call via the switch means, without the need for utilizing the conductive path established by the switch means.

The present invention accordingly provides a telephone exchange system as taught in the above reference application in which a signal responsive element, such as a call fee meter, a line cut-off relay, or the like, is individually associated with each of at least some of the telephone lines served by the exchange, and in which the date processing logic of the exchange includes interrogation means individual to each of said functional units and responsive to coincidence between receipt by said functional unit of a signal to which such a responsive element is to respond and an output signal from the comparator of the store of said functional unit, for producing an output signal, all of said signal responsive elements being connected by way of a common signal highway to the outputs of all of said interrogation means of said functional units and means being provided for enabling each of said signal responsive elements in turn, on a time division multiplex basis defined by said address generating means, to respond to an output signal received via said common signal highway.

Thus it will be seen that, in the arrangement of the invention, signals arising in any part of the distributed data processing logic of the exchange system are transmitted indirectly to the signal responsive elements on a time division multiplex basis, the element for which any given signal is intended being defined in terms of the time slot in which the signal arises, without there being any need for an individual connection to be established between the switching means serving a given telephone line and the signal responsive element associated with the latter.

A particular advantage of the arrangement according to the invention is that the use of a common signal highway reduces the number of connecting leads required between the main body of the telephone exchange and the signal responsive elements. When the signal responsive elements are call fee meters, for example, this facilitates the location of the meters at a position remote from the main exchange apparatus, as may be required in the case of a hotel PABX system where the telephone meters are usually located in the vicinity of the cashier's desk, usually in the hotel foyer.

The invention is illustrated by way of example in the accompanying drawing, the single FIGURE of which shows a schematic circuit diagram of an arrangement according to the invention for transmitting meter fee pulses from an exchange line circuit to a call fee meter associated with a telephone line of the exchange systems.

Referring to the drawing, the metering arrangements there shown are intended for application to the 100 line Private Automatic Branch Telephone Exchange, the operation of which is described in detail in the above referenced application.

Briefly, this telephone exchange system comprises a number of separate apparatus units and an associated system of data transfer highways. The apparatus units are of two general kinds, viz., those whose functions are related to the services provided by the exchange and which are termed the service units, and, those whose function is related to the control of the service units and which are termed the common units of the exchange. The service units take the form of registers, local line units, exchange line units and so on while the common units include a master scanner, driven from a central clock source, an associated group of 100 line gates, as well as a line state discriminator, a class-of-service translator and a sequencer unit. The master scanner is driven by clock pulses supplied from the central clock and generates successively and cyclically the numerical identities of the 100 telephone stations served by the exchange. These identities are applied, at each scanner step, in the form of signal pulses on a group of extension identity highways. The line state discriminator, class-of-service and sequencer units perform control and programming functions not concerned with the present invention. Each service unit of the system incorporates one or more stores for recording either a called or a calling telephone station identity, or both of these, and each store has an associated comparator element by means of which coincidence is detected when an identity registered in a store and the identity being generated by the master scanner are the same. When a new call arises, this is detected by the line state discriminator unit, which arests the master scanner at the scan position corresponding to the calling station identity, and causes a free register unit to be allocated to take the call. The allocated register reads the calling station identity from the extension identity highways, makes connection to the station line wires, and proceeds to send dial tone, upon receipt of which the caller proceeds to dial a preliminary prefix digit, followed by the digits of the wanted number. When the register has received all the dialled digits it requires to enable it to proceed with the call, it transfers this information to an appropriate other service unit of the exchange, which it does in substantially the same manner as that described above for a new call, that is, it stops the master scanner on the identity of the calling station thereby again staticising this information on the identity highways, and causes a free one of the appropriate type of other service unit to be allocated to deal with the call, whereupon the allocated service unit reads the staticised identity into its calling number store. If it is a local call, the other service unit willl be a local line unit and in this case the register will also have registered the called station identity in which case the transfer process is repeated, this time in respect of the called station identity. In the allocated local line unit, receipt of the station identities also effects the setting of coupling switches to the calling and called lines, and the call proceeds under control of the local link unit, the register being meanwhile released. If the call is an external line call, then the other service unit will be an exchange line unit, within which a trunk or junction line to the external public exchange is terminated. In this case, the fact that an external call is required is indicated by the value of the discriminating digit dialled, upon receipt of which the register immediately initiates transfer of the calling extension identity to the allocated exchange line unit in exactly the same manner as described above for the local line unit. Receipt of the calling line identity in the exchange line unit causes the coupling switch of this unit to set to the calling line and the subsequently dialled impulse trains are repeated over the exchange line to the public exchange.

In some PABX installations, an extension metering facility is preferred to the application of a "barred trunk" facility whereby certain extensions are prevented from establishing external calls, and the accompanying drawing shows how a PABX exchange as described above can readily be adapted to provide an extension metering facility as required. To this end the diagram shows in block schematic only, a master scanner MS, the drive clock source CK, and an exchange line unit ELU. Within the exchange line unit, only those elements which concern the provision of the metering facility are shown. The unit has a coupling switch indicated by the switch wiper and banks SWA1 and SWA2 by means of which it can couple itself to a line wire pair such as the pair SLN, shown extending from the left hand side of the unit, while the exchange line wires which the exchange line unit terminate, extend from the right hand side of the unit as indicated at TJL. Additionally a meter pulse highway MPH is provided to which all exchange line units of the exchange may be connected. The meter pulse highway is terminated by a logic element BA which comprises an anti-bounce delay element DE and inverter elements IV1 and IV2. Within the logic element BA the meter pulse highway is split into two branch highways designated MP and $\overline{MP}$ respectively. A separate meter pulse element MPE is provided for each extension line in respect of which call metering is required and these elements are connected to the branch highways MP and $\overline{MP}$, in parallel with one another. The meter pulse element comprises a call fee totalling meter SM, a drive amplifier DA, control gates CG1 and CG2 and a toggle element TG constituted by gates TG1 and TG2. The drive amplifier, control and toggle gates, would normally be formed as a single integrated circuit element located adjacent the meter SM.

The metering elements MPE are addressed from the master scanner which is arranged to provide, separate from the extension identity highways EID, two groups of 10 output leads ovver which the station line identities are marked on a decimal basis. These output leads are terminated upon respective "tens" and "units" terminal blocks TN and UN. Thus as each line is scanned, its numerical identity is indicated by the appearance of a marking potential on one terminal in each of these terminal blocks. Within the elements MPE, the control gates CG1 and CG2 each have a first input connected to the respective branch highway MP or $\overline{MP}$, while their second and third inputs are respectively connected, in parallel, to one each of a pair of terminals designated T and U, respectively. These terminals along with the groups of terminals TN and UN may be constituted as a strappable terminal field, so that by inserting a strap ST between a particular "tens" terminal in the terminal group TN and the gate terminal T, and a strap SU between a particular "units" terminal in the terminal group UN and the gate terminal U, the associated metering pulse element MPE is permanently associated with the extension line identity defined by the selected "tens" and "units" strappings.

To describe the operation of the metering arrangement, we will assume that the exchange line unit ELU has registered the identity of the line SLN in its store ST, as a consequence of which, the switch element of the store has been set to couple the line SLN through to the external exchange line TJL, and that the dialled impulse trains have been repeated to the public exchange, which has established the required connection. At some time after the response of the called external subscriber, the public exchange will revert one or more metering pulses over the exchange line TJL, to the exchange line unit ELU. These metering pulses will normally to be in the form of A.C. signals applied longitudinally to the exchange line wires.

Within the exchange line unit, the or each metering pulse is detected by a detector element DET which produces corresponding DC output pulses to operate a meter relay MR which operates for the duration of each metering pulse received. A make contact MR1 of the metering relay MR is included in a connecting lead CL which extends from the output from the ocmparator COMP to the meter pulse highway MPH. Included in the circuit connection between make contact MR1 and the comparator COMP are two diodes which function to conduct negative output pulses from comparator COMP through relay contacts MR1 over lead CL and also to circuit logic not otherwise associated with the present invention. The pulses from the comparator COMP transmitted through the diodes is not limited to negative pulses, positive pulses with appropriate circuit changes would function just as efficiently, however the diodes shown would of necessity be reversed. The only function of said diodes being to prevent interaction between the circuit logic referred to above and those elements connected to lead CL.

On receipt of a meter pulse, the relay MR is operated to close its contact MR1, thereby establishing a conductive path between the comparator output and the meter pulse highway. when the master scanner next generates the identity of the line SLN, the comparator will detect coincidence between this identity and that registered by the store ST and, in consequence thereof, the comparator will pass an output pulse, over the connecting lead CL and the meter pulse highway MPH to the logic element BA which, by the action of the inverters IV1 and IV2, applies a pulse of binary "1" significance to the branch highway MP, and a corresponding pulse of binary "0" significance to the branch highway $\overline{MP}$. In the meter pulse element MPE, the binary 1 pulse on branch highway MP is applied to gate CG2 coincidently with the address marking applied to the second and third inputs to this gate from the terminals T and U, so that this gate opens to pass an output to set the toggle TG. The gate CG1 remains closed at this time since it is unresponsive to the binary 0 pulse on branch highway MP. Toggle TG setting, passes an output signal from the toggle gate TG2, via the drive amplifier DA to operate the call fee meter SM. At the end of the scan period, when the master scanner generates the next station identity, the output signal from the comparator COMP is terminated with the result that the control gate CG2 in the metering element MPE, closes, leaving toggle TG set, so that the meter SM is held operated. When the line SLN is again scanned, if the meter pulse still exists, the action above described will be repeated, but without effect since toggle TG is already set. However, if the metering pulse has terminated and the metering relay released, when this station identity is next scanned, then the through path over lead CL between the comparator outpput and the meter pulse highway is disconnected, and consequently no metering pulse is applied to the logic element BA. In this condition, the branch highway MP is at binary 0 while the branch highway $\overline{MP}$ is at binary 1, with the result that the control gate CG1 operates to the coincident "tens" and "units" address markings. Gate CG1 operating re-sets the toggle TG, thereby removing the output signal from the toggle gate TGZ and the meter SM restores.

As mentioned above, it may be advantageous to locate all of the meter pulse elements MPE at a position remote from the main exchange apparatus, together with the line splitting element BA, and it can be seen that all that is necessary in this case is to extend the meter pulse highway MPH and the leads from terminals TN and UN. Connections to one hundred meter pulse elements may thus be established by means of only twenty one wires. It will be appreciated that the subscriber meters SM and amplifiers DA described above could readily be replaced by respective elements of a composite data storage means adapted for read out to a printer or the like, where more sophisticated metering arrangements are required.

It will also be appreciated that arrangements generally similar to the metering arrangements described above may be provided whenever it is required to revert a signal over an established switch, or train of switches, to effect a control operation at the point of origin of a connection in an exchange switching system of the kind where the exchange switches serves to extend only the line wires involved in a connection. Thus such a system may employ line circuits of the kind incorporating a cut-off relay, which serves to disconnect the call detecting elements of the line circuits from the line wires, when a call has been answered by another service unit within the exchange, the line circuit cut-off relay being operated in a substantially identical manner to that described above for the metering signal, it being necessary to provide only one additional highway linking the service units in question, the highway being terminated by a line splitting element such as BA, and each extension line circuit being provided with a line cut-off relay operating element of similar form to the meter pulse element MPE.

What is claimed is:

1. A telephone exchange system including, a plurality of telephone lines; data processing apparatus comprising a plurality of functionally different apparatus units of which each unit includes a store for receiving data presented thereto in a predetermined code and a comparator for detecting coincidence between data stored in said unit and data presented thereto, a data generating means arranged to generate cylically all possible combinations of coded data to be presented to said stores, said generating means being connected to all such stores in order to present the generated data simultaneously thereto, and said generating means further operable to generate address signals cyclically for enabling each of said signal responsive elements; said generating means being connected to all such stores in order to present the generated data simultaneously thereto, means for initially registering data in a store of at least one of said units, and means, included in or associated with each of said units or at least some of said units, for transferring data stored in such a unit to a further one of said units, the said data transferring means comprising means operable when the comparator of said unit detects coincidence between the data being generated at any time and the data stored by the transferring unit, for allotting a store of a further unit to receive the data being generated at this time; the improvement comprising: a signal responsive element, individually associated with each of at least some of the telephone lines served by the exchange, and in which the data processing apparatus of the exchange includes interrogation means individual to each of said apparatus units and responsive to coincidence between receipt by said apparatus unit of a signal to which such a responsive element is to respond and an output signal from the comparator of said apparatus unit, for producing an output signal, all of said signnal responsive elements being connected by way of a common signal highway to the outputs of all of said interrogation means of said apparatus units and means being provided for enabling each of said signal responsive elements in turn, on a time division multiplex basis defined by said data generating means, to respond to an output signal received via said common signal highway.

2. A telephone exchange system as claimed in claim 1, wherein: said signal responsive element includes a call fee meter.

3. A telephone exchange system as claimed in claim 1, wherein: said signal responsive element includes a line cut-off relay.

* * * * *